United States Patent
Baker

(10) Patent No.: US 6,857,628 B2
(45) Date of Patent: Feb. 22, 2005

(54) MODULAR PLATFORM ASSEMBLY

(75) Inventor: Steven E. Baker, Baltimore, MD (US)

(73) Assignee: University of Maryland, Riverdale, MD (US)

( * ) Notice: Subject to any disclaimer, the term of this patent is extended or adjusted under 35 U.S.C. 154(b) by 267 days.

(21) Appl. No.: 10/069,354
(22) PCT Filed: Mar. 8, 2001
(86) PCT No.: PCT/US01/07227
§ 371 (c)(1),
(2), (4) Date: Feb. 25, 2002
(87) PCT Pub. No.: WO01/67373
PCT Pub. Date: Sep. 13, 2001

(65) Prior Publication Data
US 2004/0074176 A1 Apr. 22, 2004

Related U.S. Application Data
(60) Provisional application No. 60/187,782, filed on Mar. 8, 2000.

(51) Int. Cl.[7] .................................................. B25B 1/00
(52) U.S. Cl. ............................ 269/45; 269/88; 269/900
(58) Field of Search .......................... 269/91, 303, 900, 269/93, 45, 88, 203, 139, 289 R

(56) References Cited

U.S. PATENT DOCUMENTS 6,279,888 B1 * 8/2001 Wal, III ........................ 269/37
6,375,177 B1 * 4/2002 Witte ........................... 269/45

* cited by examiner

Primary Examiner—Robert C. Watson
(74) Attorney, Agent, or Firm—Dykemaa Gossett PLLC

(57) ABSTRACT

A modular platform assembly for providing at least one breadboard surface level above a table includes a rectangular breadboard plate having holes therein, a pillar member for supporting each corner of the rectangular breadboard plate, and a base member for supporting each pillar member on a table top. By using multiple breadboard plates and multiple pillars, a first surface level of varying horizontal dimensions can be provided, as well as multiple vertically-spaced levels. The invention enables the creation of enlarged three-dimensional work surfaces above a table top, thus enhancing utilization of space in a small area.

8 Claims, 3 Drawing Sheets

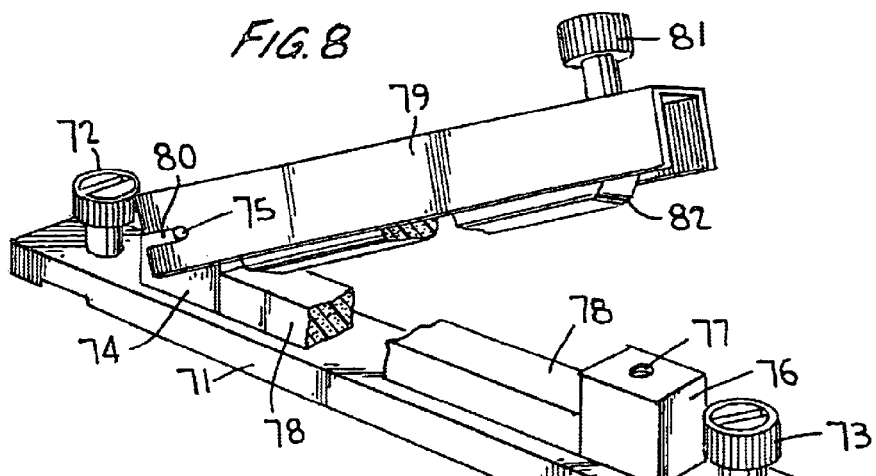
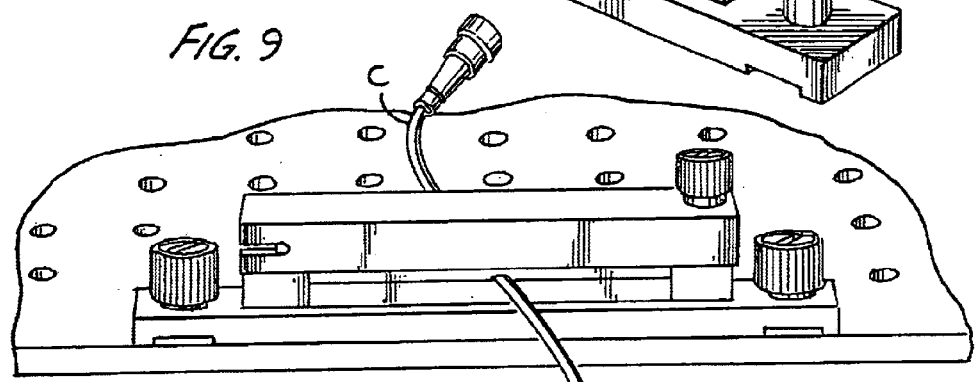
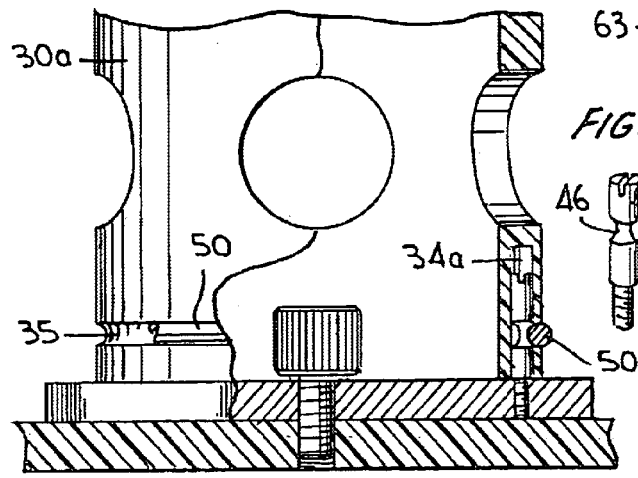
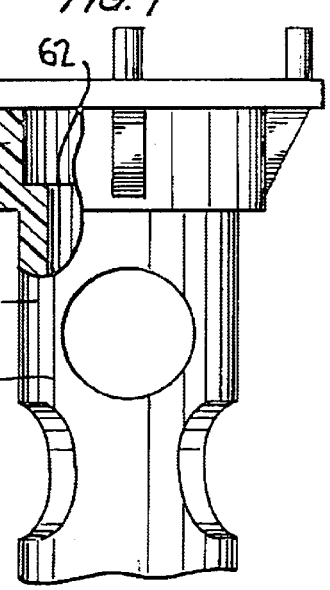

US 6,857,628 B2

MODULAR PLATFORM ASSEMBLY

This application claims the benefit of provisional application No. 60/187,782, filed Mar. 8, 2000.

BACKGROUND OF THE INVENTION

1. Field of the Invention

This invention relates to work tables, particularly test tables, and most particularly to breadboard test tables used for conducting research and testing of optical fibers and cables.

2. The Prior Art

Work tables, and particular test tables used for supporting optical fibers and cables and test equipment associated with research and experimentation relative thereto, known as breadboard tables, are well known. Such tables, which normally provide a large horizontal metal top surface containing a regular pattern of threaded holes for fixedly attaching the necessary equipment thereon, can be heavy and rigid in construction, or of the floating type (Newport Table).

Research utilizing such tables is usually conducted in labs where space can be at a premium. At the same time, the number of optical fibers or cables under investigation at any one time can be large, and the associated equipment for each fiber or cable, e.g., clamps, meters, sensors, etc., can occupy much space. These is always a need and desire to make better use of the available space in the lab so as to facilitate the research work.

SUMMARY OF THE INVENTION

The present invention is directed to a platform assembly, in particular a modular platform assembly, which can be fixedly mounted on the top of a work or breadboard test table of the type mentioned above to provide one or more additional work surface levels above the one provided by the top of the table, thus dramatically increasing the available surfacing for work and testing in a three dimensional sense. The additional work surface levels will include the a regular pattern of holes, e.g., threaded holes like those found on the conventional test table therebelow, thus enabling the normally used clamps, meters, sensors, etc., to be fixedly attached and provide the necessary stability for the desired testing.

According to the invention, the provided platform levels above the top of the underlying table can have a horizontal area about equal to the area of the pattern of holes on the table top, and each level can provide either a continuous or discontinuous work or test surface. The support legs or pillars that support the work surfaces can be hollow so as to provide passageways for cables or cords to pass downwardly therethough in a protected manner.

The invention will now be better understood by reference to the accompanying drawings, taken in conjunction with the following discussion.

BRIEF DESCRIPTION OF THE DRAWINGS

In the drawings,

FIG. 6 is an enlarged view of a bottom portion of another embodiment of pillar member and associated base member when connected together and wherein a clamping ring is used to fixedly connect the two members together;

FIG. 6A shows a perspective view of a dowel from the base member shown in FIG. 6, FIG. 7 is a view of an upper portion of an alternate embodiment of pillar member; and FIGS. 8 and 9 are perspective views of a work clamp that can be a component of the platform assembly of the present invention.

DETAILED DESCRIPTION OF THE PREFERRED EMBODIMENTS

Figure 1:
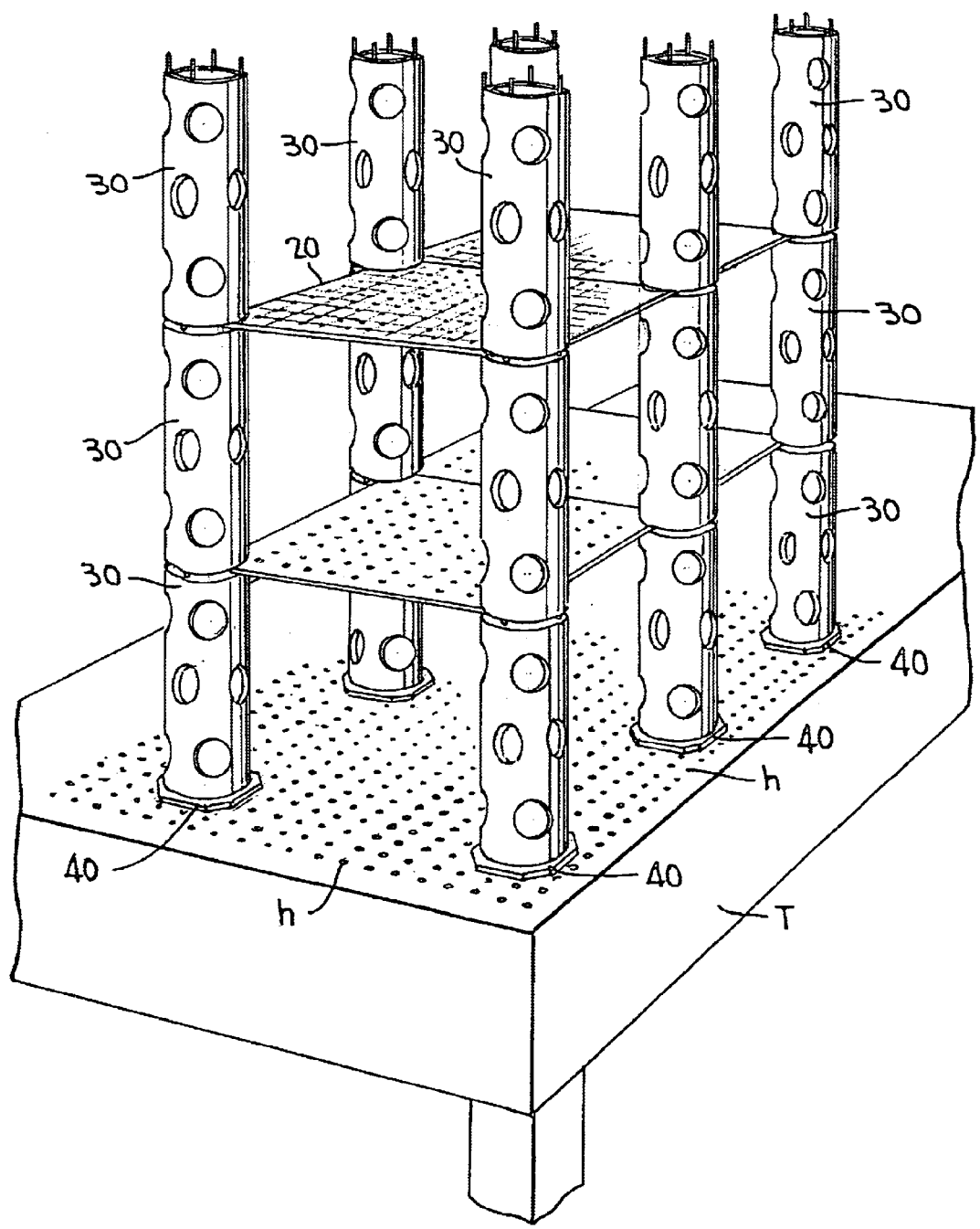
FIG. 1 is a perspective view of a multilevel breadboard platform constructed at the corner of a breadboard table (test table) using components of the modular platform assembly of the present invention.
Figure 2:
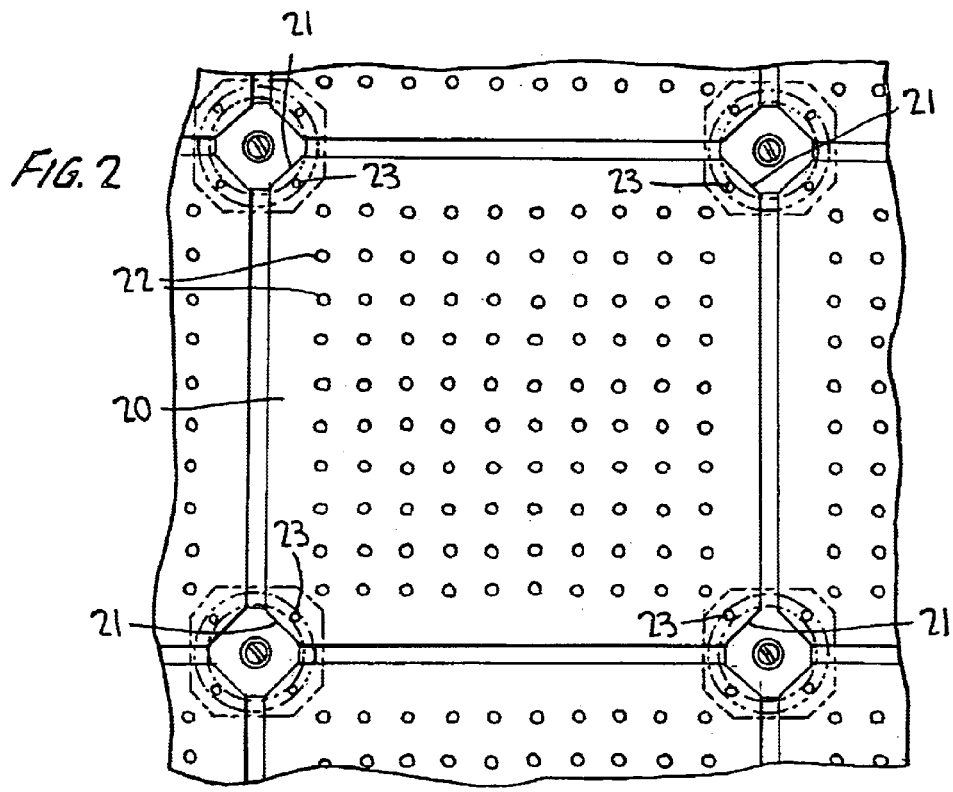
FIG. 2 is a plan view of a breadboard plate and portions of adjacent breadboard plates mounted on four pillar members of the modular platform assembly of the present invention.

FIG. 1 shows a multilevel breadboard platform constructed at the corner of a breadboard table T using components of the modular platform assembly of the present invention. The breadboard table, which can be of the fixed or floating type (Newport table) and is usually made of metal, is shown to have a rectangular pattern of threaded holes h in its top. These holes are conventionally spaced 1 inch on center. Such a table is used for positioning equipment used in research and testing of fiber optic cables.

The components of the modular platform assembly enable the construction of at least one breadboard surface above the top of the breadboard table which increases the usable surface for research and testing in a limited space. The basic components include a breadboard plate 20, pillar members 30 and base members 40.

The breadboard plate 20, which can be made of rigid plastic and is preferably transparent, is generally square in shape, although squared off at its corners 21, and it includes a rectangular pattern of threaded holes 22, identical to holes h, that are 1 inch on center and enable the fixed positioning thereon of the same equipment that would otherwise be fixed on the top of breadboard table T. In addition, positioning holes 23 are located adjacent the edges 21 to enable the breadboard plate to be properly positioned on the pillar members 30, as will be discussed below.

Figure 3:
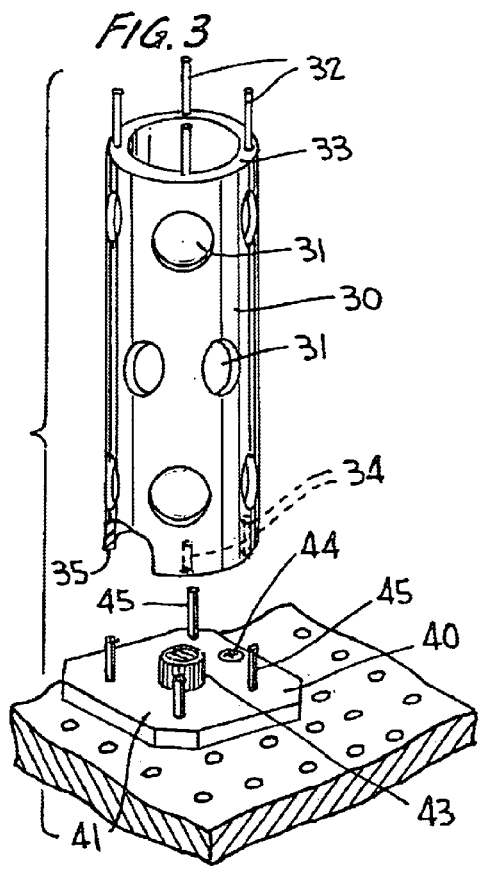
FIG. 3 is an exploded perspective view of a pillar member and its associated base member, shown attached to the top surface of the breadboard table.
Figure 4:
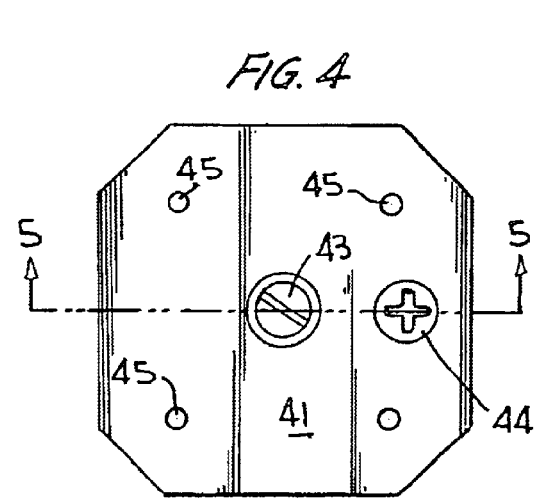
FIG. 4 is an enlarged top plan view of a base member.
Figure 5:
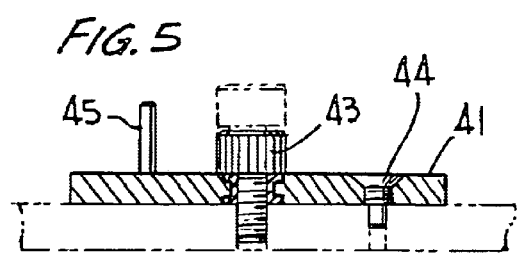
FIG. 5 is a section of FIG. 4 as seen along line 5—5.

As seen in FIG. 3, each pillar member 30 is shaped as a tube having access holes 31 in its peripheral wall, and it includes four positioning pins 32 that axially extend from its upper end (annular) wall 33 and four blind bores 34 which axially extend into its lower end (annular) wall 35. The pins 32 are equally peripherally spaced and are sized to fit with a minimum of play in a respective positioning hole 23 of a breadboard plate 20. The blind bores 34 are equally peripherally spaced and can accept positioning pins 32 from a pillar member therebelow, or alternatively dowels extending upwardly from a base member 40. The holes 31 enable power cords, hoses or cables to extend downwardly therein from one or more breadboard plates thereabove and to exit onto the breadboard table or extend to other nearby equipment.

As best seen in FIG. 3, each base member 40 includes a square plate 41, preferably made of metal, that is squared off at is corners 42, and includes a captive screw 43 at its center that is threadedly engageable in a threaded hole h in the breadboard table T. A positioning screw 44, 1 inch on center relative to the captive screw 43, is threadedly engageable in another hole h to non-rotatably position the plate 41 on the breadboard table top. Four dowels 45 extend upwardly from a top surface of the plate 41 to fit within the blind bores 34 in a pillar member 30 positioned thereon.

After appropriately fixing four base members 40 on the breadboard table T and respectively positioning four pillar members 30 on the respective base members, a breadboard plate 20 can be positioned on the upper ends of the pillar members, the positioning holes 21 at the four corners of the breadboard plate fitting over respective pins 32 of the pillar members, thus creating a small single-level breadboard platform above the breadboard table T. By fixing more base members and more pillar members on the breadboard table and then positioning more breadboard plates on the pillar members, the area of the single-level breadboard platform can be increased to the desired extent.

To create another level of the breadboard platform above the first, pillar members are positioned on top of the upper ends of the pillar members supporting breadboard plates (thus locking the breadboard plates in their level), and then positioning more breadboard plates on the upper ends of the new pillar members. Like the level therebelow, the area of the second level can be expanded by increasing the number of pillar members and bread board plates used.

As indicated in FIG. 3, a pillar member 30 is vertically mountable on a base member by positioning the blind bores 34 over the dowels 45. However, the pillar member is not locked in position. According to FIG. 6, in an alternative embodiment a pillar member 30a includes a peripheral channel 35 that communicates with each of the blind bores 34a, and the base member 40a includes dowels 45a which have notches 46 (see FIG. 6A) so that when positioned in the blind bores 34a, a ring 50 can be positioned in the peripheral channel 35 and in each of the notches 46 to lock the pillar member 30a onto the base member 40a.

As noted above, when a pillar member 30 is mounted above another pillar member which is supporting a breadboard plate, i.e., so as to create another platform level thereabove, the supported breadboard plate becomes locked in position. According to FIG. 7, in an alternative embodiment of pillar member 60, its upper body portion is formed with an enlarged top 61 that forms an internal shoulder 62 for abutment by a lower body portion 65 of a similar pillar member. The top 61 also includes an annular flange 63 with pins 64 over which a corner positioning hole of a breadboard plate can extend. The lower body portion will include blind bores (not shown) similar to the blind bores 34 in the FIG. 3 embodiment for mounting on a base member 40. With such pillar members, even when mounted on top of one another, a mounted breadboard plate can be upwardly lifted relative to the pins 64 and removed from its level when desired.

FIGS. 8 and 9 depict a work clamp 70 that can be a component of the modular platform assembly of the present invention. It includes an elongated base 71 having captive screws 72 and 73 near it opposite ends (these screws are spaced so as to fit within holes h in the table T), first and second block posts 74 and 76, and an elongated pad 78 therebetween. The first post 74 includes pins 75 extending from opposite sides thereof, and second post 76 includes a threaded hole 77 in its top surface. A cooperating elongated flange 79 having a C-shaped cross section includes aligned slots 80 at its first end, a captive screw 81 near its second end, and an elongated pad 82 therebetween. The first end of the flange can fit over the first block post 74 with the pins 75 extending in the slots 80, and the second end of the flange can be pivoted down and over the second block post so that the captive screw 81 can be screwed into the threaded hole 77. The pads 78 and 82, when pressed together, can fixedly position a cable C therebetween as depicted in FIG. 9, which is commonly desired during experimentation and testing of such cables.

Although some preferred embodiments of the invention have been shown and described, various changes can be made and still fall within the scope of the claims.

What is claimed is:

1. A modular platform assembly for providing at least one breadboard surface level above a breadboard table (T), said modular platform assembly comprising:

a rectangular breadboard plate (20) which has a plurality of attachment holes (22) and a positioning hole (23) at each corner thereof, a separate pillar member (30,60) for supporting each respective corner of said breadboard plate, each said pillar member including a pin (32,64) that axially extends from a first end (33,63) thereof and four blind bores (34) that axially extend into a second end (35) thereof, and a base member (40) for supporting each pillar on said breadboard table, each base member including a plate (41) having a first element (43) at a center thereof for connection to a hole (h) in said breadboard table to connect said base member to said table, a second member (44) for connection to another hole in said breadboard table to non rotatably position said base member in place on said table, and a plurality of dowels (45) which extend upwardly from said plate to fit within corresponding blind bores in a second end of an associated pillar member.

2. A modular platform assembly according to claim 1, wherein a plurality of said breadboard plates are supported by a plurality of said pillar members mounted on respective base members to provide an enlarged breadboard surface level above said breadboard table.

3. A modular platform assembly according to claim 1, wherein additional pillar members are positioned above pillar members supporting a breadboard plate by fitting blind bores thereof over pins of a pillar, member therebelow, and additional breadboard plates are positioned on said additional pillar members to provide an additional breadboard surface level above said breadboard table.

4. A modular platform assembly according to claim 1, wherein said pillar members are hollow and include access holes (31) in a side wall thereof.

5. A modular platform assembly according to claim 1, wherein said first and second members are screws.

6. A modular platform assembly according to claim 1, wherein said breadboard plate is made of plastic.

7. A modular platform assembly according to claim 1, wherein said plurality of attachment holes are in a rectangular pattern.

8. A modular platform assembly according to claim 1, wherein said pillar member includes a peripheral channel (35) which communicates with each of said blind bores, wherein each dowel of said base member includes a groove (46) therein that will be in register with said peripheral channel when said dowel is positioned in a respective blind bore, and including a ring member (50) that is positionable in said peripheral channel and into said grooves to lock said pillar member and said base member together.

* * * * *